(No Model.) 2 Sheets—Sheet 1.
M. O. SMITH.
DRAG SAW.
No. 312,299. Patented Feb. 17, 1885.
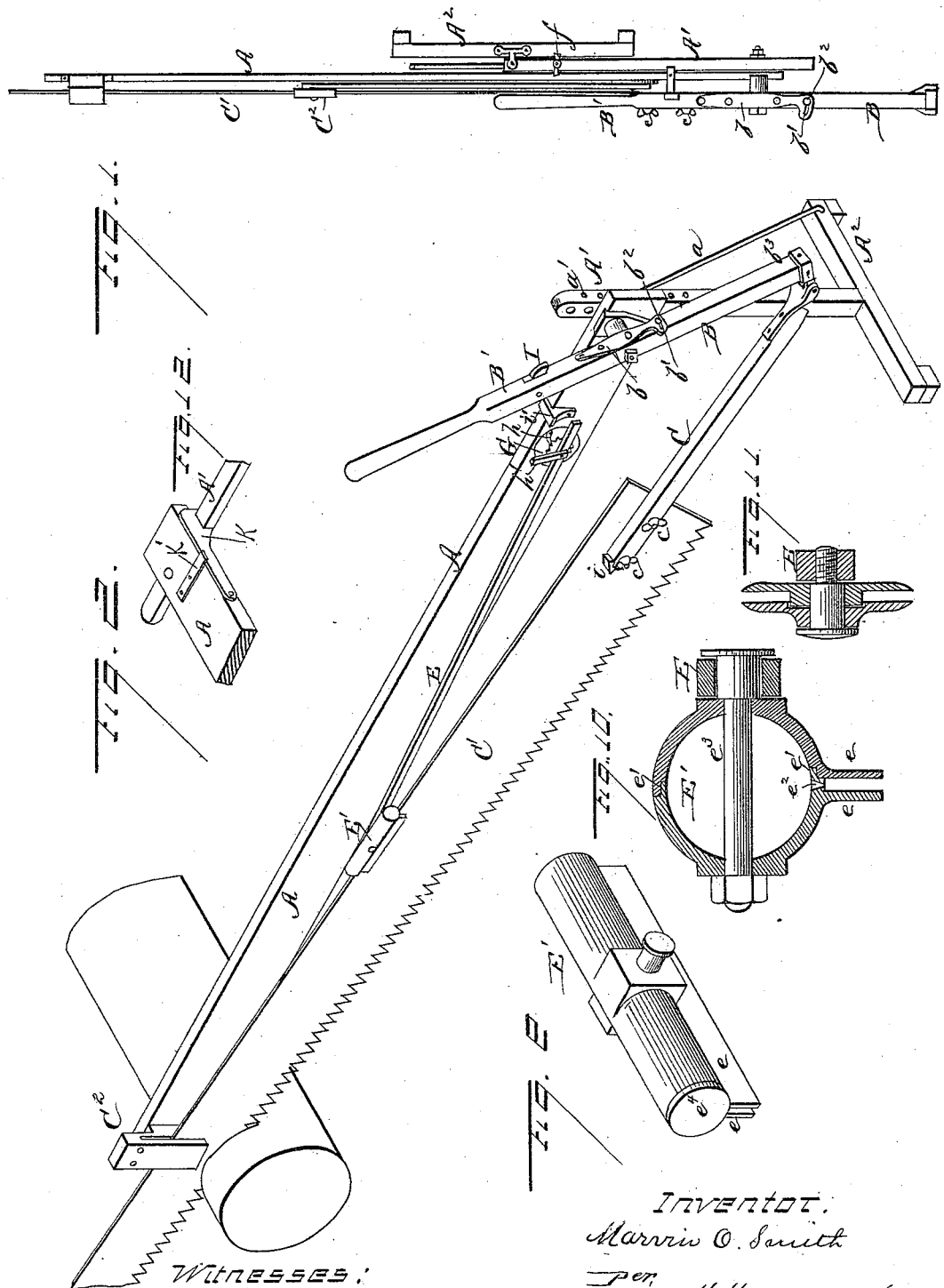
Witnesses:
H. C. McArthur
A. Paré
Inventor:
Marvin O. Smith
per
H. Harrison
Attorney.

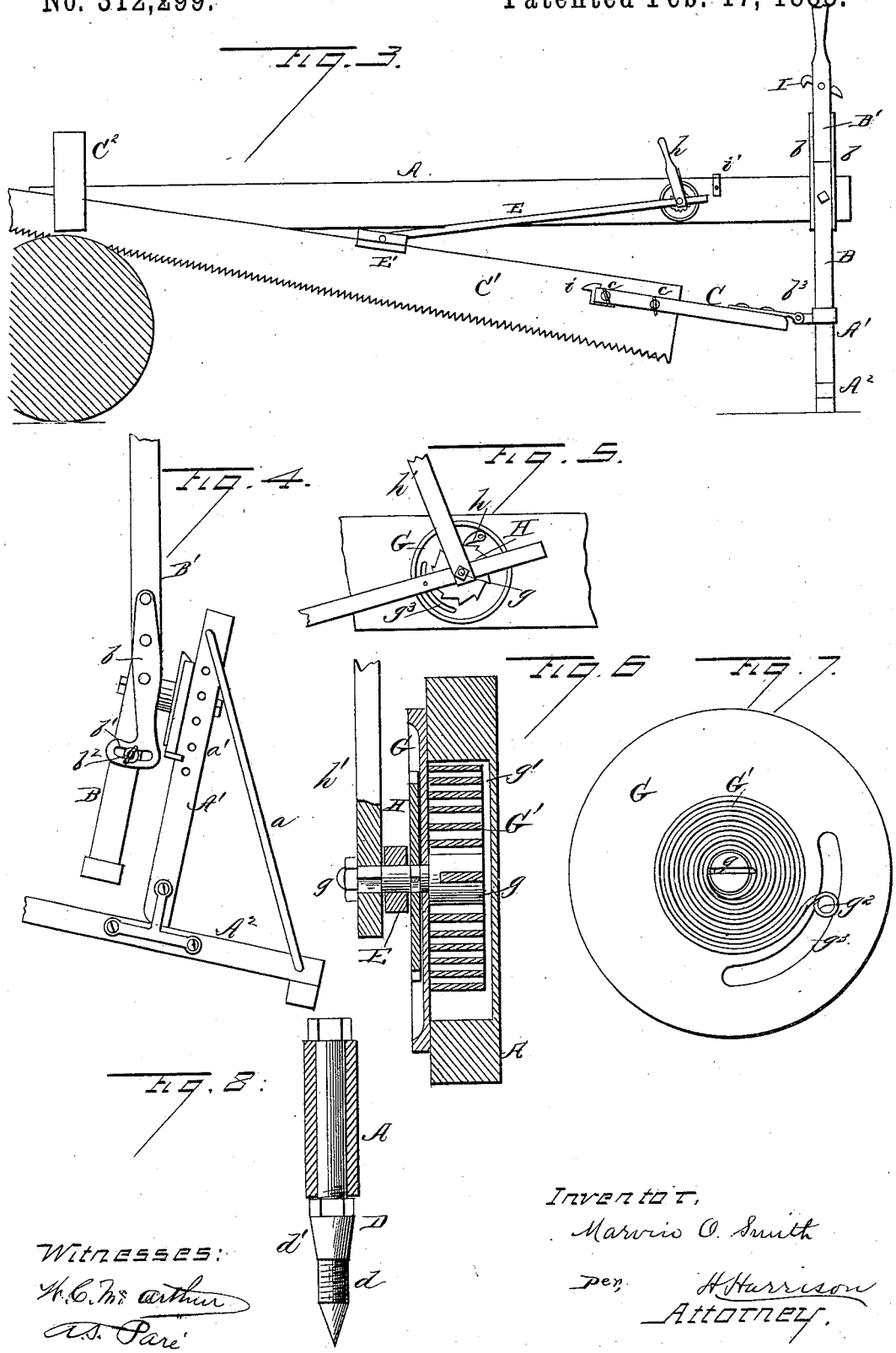

UNITED STATES PATENT OFFICE.

MARVIN O. SMITH, OF NEW BUFFALO, MICHIGAN.

DRAG-SAW.

SPECIFICATION forming part of Letters Patent No. 312,299, dated February 17, 1885.

Application filed April 14, 1884. (No model.)

*To all whom it may concern:*

Be it known that I, MARVIN O. SMITH, a citizen of the United States, residing at New Buffalo, in the State of Michigan, have invented certain new and useful Improvements in Drag-Saws, of which the following is a specification, to wit:

This invention relates to an improvement in drag-saws; and it consists in certain peculiarities of construction and arrangement of the same, substantially as will be hereinafter more fully described and claimed.

In order to enable others skilled in the art to which my invention appertains to make and use the same, I will now proceed to describe its construction and operation, referring to the accompanying drawings, in which—

Figure 1 is a view of the device folded. Fig. 2 is a perspective view in position for work; Fig. 3, a side elevation; Fig. 4, a rear elevation. Figs. 5, 6, and 7 are detail views of the spring device for applying pressure to the saw. Fig. 8 is a detail of the holding spike or pin, and Figs. 9 and 10 are views of the hollow pressure-slide. Fig. 11 is a modification of the saw-slide, and Fig. 12 is the spring which holds the pivoted leg in position.

A represents the main bar or arm of the machine, to the rear end of which is hinged or pivoted an upright or support, A', having a hinged cross-bar or foot, A², upon its lower end, held rigidly in place by a brace-rod, $a$, the upper end of which enters any one of a series of holes, $a'$, in the upright, and renders the relative position of the support and its foot adjustable to suit the operator.

Upon one side of the board or arm A, near its rear end, is pivoted an operating-lever made in two parts, B B', as shown fully in Fig. 4. The lower part, B, of this lever is pivoted to the board, as shown, and the upper portion, B', is provided with two plates, $b$, rigidly secured thereto and pivoted to the lower section of the lever, and the lower ends of these plates are formed with transverse slots $b'$, which enables them to be adjusted as in Fig. 4, and secured by a thumb-nut, $b^2$. This is convenient to adjust the lever when the machine stands upon an incline, as represented, and obviates the necessity of leaning over the machine in an awkward position while at work, as will be at once understood.

The lower end of the operating-lever is hinged at $b^3$ to an arm, C, rigidly connected at its other end to the saw C' by means of bolts and thumb-screws $c$. The outer end of this saw C' runs in a guide, C², secured upon the main bar A, as usual.

It has been found in practice that the spike or pin $d$, which passes through the end of the arm A and is driven into the log, is liable to break under the strain if left of sufficient length to properly hold the log; and to obviate this I use the pin or spike $d$, passing through the arm, as in Fig. 8, and secured by a nut, D, having a conical extension, $d'$, as shown. This braces and strengthens the spike, and at the same time the tapering form of the nut admits of its being driven through the bark of a log and partially into the main body, and gives a solid hold upon the work without exposing a large amount of the spike, as will be at once seen.

To place sufficient pressure upon the back of the saw to cause it to effectively "bite" the work under operation, I provide an arm, E, upon the outer end of which is pivoted a hollow slide, E'. This slide consists of a hollow cylinder of suitable length, made in two parts, each of which is cast with a downwardly-projecting flange, $e\ e$, which clasp the saw. The two parts of this cylinder are provided with intermeshing flanges $e'$, to render it tight when placed together, and the lower one, upon which the saw runs, is cast upon a chill, to resist wear, and provided with a series of small holes, $e^2$, opening into the saw-guide between the flanges $e\ e$, and when the interior is filled with any suitable lubricant these openings admit the passage of sufficient to keep the contacting parts in proper condition. The two parts of the cylinder are held together by a bolt, $e^3$, which is also the pivotal connection with the arm E, as in Figs. 9 and 10. The lubricating material may either be placed within its receptacle by the removal of this bolt and separation of the parts, or one end of the cylinder may be provided with a cap, $e^4$, as in Fig. 9. The other end of the arm E is connected to a bolt or pin, $g$, upon which it swings easily, said pin being held in and passing through a plate, G, secured upon the arm or board A over a recess, $g'$, therein, as in Figs. 5, 6, and 7.

Upon the inner end of the pin $g$ is secured a coiled spring, G', having its outer end connected to a stud, $g^2$, on the arm E, passing through a curved slot, $g^3$, in the face-plate G, and acting to press down the outer end of the arm E.

Rigidly secured upon the bolt or pivot $g$, outside the plate G, is a ratchet-wheel, H, with which engages a pawl, $h$, and on the outer end of the pivot is a handle, $h'$. It is evident, therefore, that by turning the handle $h'$ and pin $g$ the spring is partially wound to obtain any desired pressure upon the arm E, and held in that position by means of the ratchet and pawl.

To one side of the upper portion, B', of the operating-lever is pivoted a double-ended hooked catch, I, and a stop or catch, $i$, is secured at the heel of the saw, and another one, $i'$, upon the board A, to hold the saw folded.

The operation of the device will now be clear. The operator stands at the side of the rear end of the device and works the lever back and forth, and if the log lies upon an incline the machine is canted over in order to cut it at right angles, and the upper part of the lever quickly adjusted to enable it to be worked without leaning over the machine, and thus soon exhausting the operator. When it is desired to move the machine, the lever is thrown forward till the saw is lifted and the hooked latch I engages with the stop $i$, and by then lifting and engaging it with the stop $i'$ the whole is held in position for convenient removal.

When folding for transportation, in addition to the operation just described, the brace-rod $a$ is folded down; then the foot $A^2$ turned up alongside the support A', and the latter folded up beside the board A and secured by a button, $f$, as in Fig. 1, the whole then occupying but little space and very easily handled.

While I prefer to use the slide E' for bearing upon the back of the saw, in some cases I may replace it by a small grooved wheel formed in two parts, and having a chilled bearing-hub corresponding to the flange $e'$ of the tubular slide, as shown in Fig. 11.

The standard A' is held rigid when extended by a latch, $k$, on the arm or board A, held in place by a spring, $k'$, as in Fig. 12.

I am aware that it is not new, broadly, to apply spring-pressure to the back of a saw, as a patent has already been granted which shows a spring-actuated roller sliding upon a horizontal guide or frame behind the saw, and I do not, therefore, claim such as my invention.

Having thus fully described my invention, what I claim as new, and desire to secure by Letters Patent, is—

1. In a drag-saw, the combination, with the saw-blade, of a hollow slide containing a lubricant, and provided with guide-flanges, and means, substantially as described, for pressing it down upon the back of the saw, substantially as shown and described.

2. In a drag-saw, the combination, with the saw and its operating-lever, of an arm pivoted upon the main frame, and provided with a slide upon its outer end bearing upon the saw, and at its inner end a coiled spring, and means for regulating the tension of the same, substantially as and for the purpose set forth.

3. The slide E', cast hollow in two parts, having the flanges $e$ and $e'$, one of which is chilled and formed with holes $e^2$, in combination with the spring-actuated arm E, adapted to press it down upon the saw, substantially as and for the purpose set forth.

4. The saw C', in combination with the lubricating-slide E', the arm E and its pivot $g$, the coiled spring G', connected to the arm and also to the ratchet-wheel H, and the pawl $h$, whereby the spring is readily wound up to exert the desired pressure upon the saw during its operation, substantially as shown and described.

5. In a drag-saw, the combination, with the main frame and its reciprocating saw-blade, of an operating-lever hinged on the main frame, and formed in two parts, one of which is adjustable at any desired angle with the other, whereby the operator is enabled to stand upright when the saw-frame is upon an incline, substantially as shown and described.

6. In a drag-saw, the main frame and its reciprocating blade, in combination with the two-part operating-lever B B', having plates $b$, secured to one part of the lever, and a slotted portion, $b'$, overlapping the other part, and the set-nut $b^2$, for securing the parts after adjustment, substantially as and for the purpose set forth.

In testimony whereof I affix my signature in presence of two witnesses.

MARVIN O. SMITH.

Witnesses:
 CHAS. KRESSMANN,
 W. C. McARTHUR.